P. B. HORTON.
Horse-Collars.

No. 130,919. Patented Aug. 27, 1872.

Witnesses

Inventor

Pemberton B. Horton
per Dewey & Co
attys

UNITED STATES PATENT OFFICE.

PEMBERTON B. HORTON, OF SAN FRANCISCO, CALIFORNIA.

IMPROVEMENT IN HORSE-COLLARS.

Specification forming part of Letters Patent No. 130,919, dated August 27, 1872.

SPECIFICATION.

*To all whom it may concern:*

Be it known that I, PEMBERTON B. HORTON, of the city and county of San Francisco, State of California, have invented an Improved Horse-Collar; and I do hereby declare the following description and accompanying drawing are sufficient to enable any person skilled in the art or science to which it most nearly appertains to make and use my said invention or improvement without further invention or experiment.

My invention relates to improvements in the manufacture of horse-collars; and it consists in the employment of eyelets for uniting the edges of the covering-leathers of the collar in front; and also in the use of rivets for uniting the roll to the collar in the bottom of the depression in which the hames rest.

In order to more fully illustrate and explain my invention reference is had to the accompanying drawing forming a part of this specification, in which—

Figure 1:
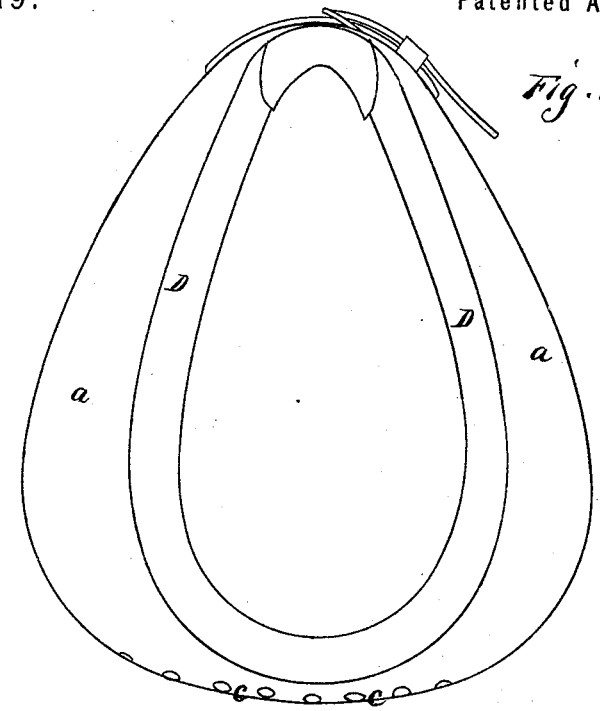
Figure 2:
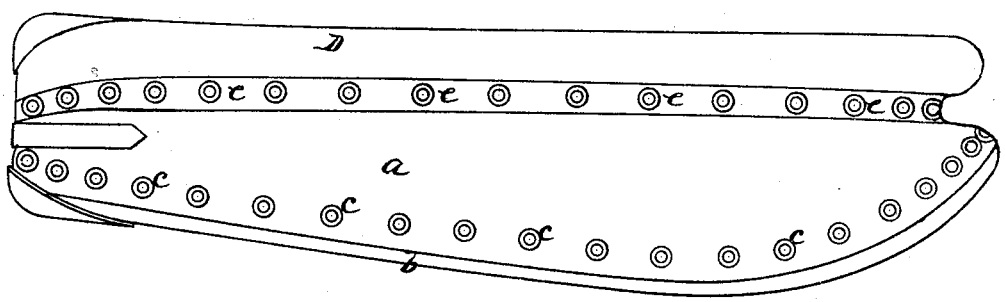

Figure 1 is a plan or front view of a collar. Fig. 2 is a side view.

*a* represents the front and *b* the back leathers which form the covering of a horse-collar. The outside edges of these leathers I unite by means of eyelets *c c c*, at short distances apart, previous to securing the two opposite edges.

The leathers are first placed together and the proper holes punched. The eyelets are then applied in the usual way. I then unite the roll D to the opposite or inner edges of the leathers *a b* by means of eyelets *e*, which pass entirely through the connection of the roll and collar, as shown, thus constructing the collar without stitching.

I prefer to employ eyelets made of copper, and usually I shall make them by cutting a copper tube which is of the proper size into short lengths; but the eyelets can be made of other metals also.

I am aware that rivets have been used for uniting the leathers in horse-collars without sewing; but the eyelets are preferable, as they are more easily applied than rivets, by the use of an eyeleting-machine; beside, the collar, when thus manufactured, will possess the advantage of providing complete ventilation for the horse's shoulders, as a hole will be left through each eyelet, as shown.

Having thus described my invention, what I claim, and desire to secure by Letters Patent, is—

As a new article of manufacture, horse-collars united by eyelets in the manner and for the purpose above described.

In witness whereof I hereunto set my hand.

PEMBERTON B. HORTON.

Witnesses:
J. L. BOONE,
C. M. RICHARDSON.